United States Patent [19]

Wareham

[11] Patent Number: 4,858,471
[45] Date of Patent: * Aug. 22, 1989

[54] PRESSURE TRANSDUCER
[75] Inventor: William Wareham, Marion, Mass.
[73] Assignee: Dynisco, Inc., Norwood, Mass.
[ * ] Notice: The portion of the term of this patent subsequent to Jul. 21, 2004 has been disclaimed.
[21] Appl. No.: 185,856
[22] Filed: Apr. 25, 1988

Related U.S. Application Data

[63] Continuation-in-part of Ser. No. 54,747, May 27, 1987, Pat. No. 4,819,487, which is a continuation-in-part of Ser. No. 54,936, May 27, 1987, Pat. No. 4,829,827, which is a continuation-in-part of Ser. No. 798,169, Nov. 14, 1985, Pat. No. 4,679,438, which is a continuation-in-part of Ser. No. 689,385, Jan. 7, 1985, Pat. No. 4,680,922.

[51] Int. Cl.⁴ .......................... G01L 7/08; G01L 9/04
[52] U.S. Cl. ........................................ 73/706; 73/708; 73/726; 338/4; 338/42
[58] Field of Search ................. 73/720, 721, 726, 727, 73/708, 706, 730; 338/4, 42; 29/517, 454, 157 R, 621.1

[56] References Cited

U.S. PATENT DOCUMENTS

| 3,349,623 | 10/1967 | Pastan | 73/726 |
|---|---|---|---|
| 3,645,136 | 2/1972 | Calhound | 73/726 |
| 3,678,753 | 7/1972 | Eggleston et al. | 338/4 |
| 3,884,078 | 5/1975 | Zeiringer | 338/4 |
| 3,934,479 | 1/1976 | Posnansky | 73/708 |
| 4,369,659 | 1/1983 | Wareham | 73/708 |
| 4,679,438 | 7/1987 | Wareham | 73/726 |
| 4,680,972 | 7/1987 | Wareham | 73/730 |
| 4,702,113 | 10/1987 | Wareham | 73/706 |
| 4,712,430 | 12/1987 | Wareham | 73/706 |

FOREIGN PATENT DOCUMENTS

| 2211609 | 9/1973 | Fed. Rep. of Germany | 73/708 |
|---|---|---|---|
| 1110137 | 4/1968 | United Kingdom | 73/708 |

Primary Examiner—Donald O. Woodiel
Attorney, Agent, or Firm—Wolf, Greenfield & Sacks

[57] ABSTRACT

A pressure transducer for in particular the measurement of relatively high pressures in the range of 10,000–50,000 psi and including an elongated frame having a capillary tube extending therethrough and employing a coupler at one end of the frame for sensing input pressure. A sensing member is provided disposed about the capillary tube at the other end of the frame and has, defined with the capillary tube, a sensing chamber in communication with the capillary tube. A recess is provided in the sensing member defining a relatively thin wall adjacent the annular sensing chamber. This wall has a pressure responsive sensing surface that extends substantially parallel to the capillary tube length and upon which strain gages are secured. A method is described for securing the capillary tube with the sensing member in a liquid tight manner.

23 Claims, 9 Drawing Sheets

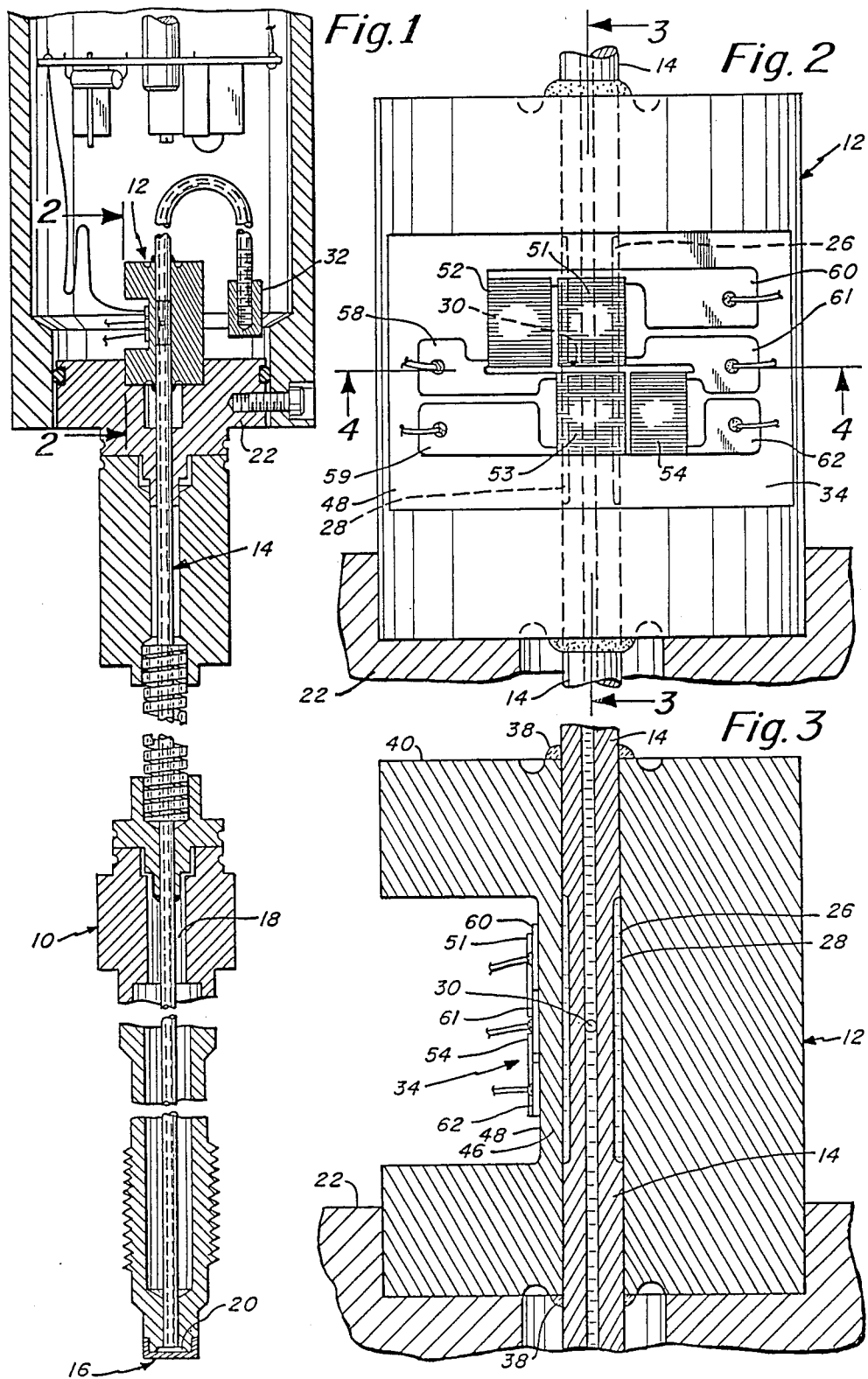

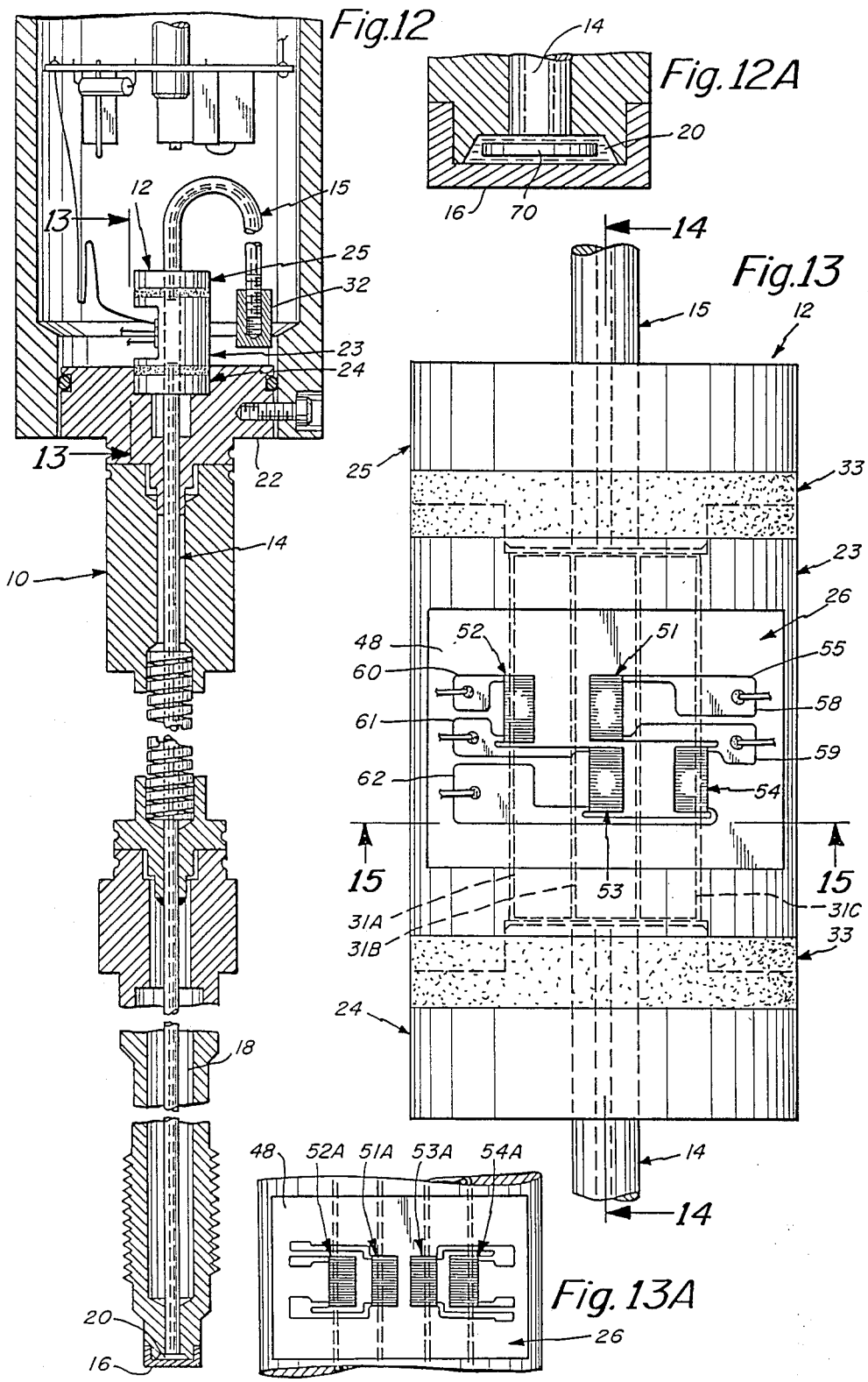

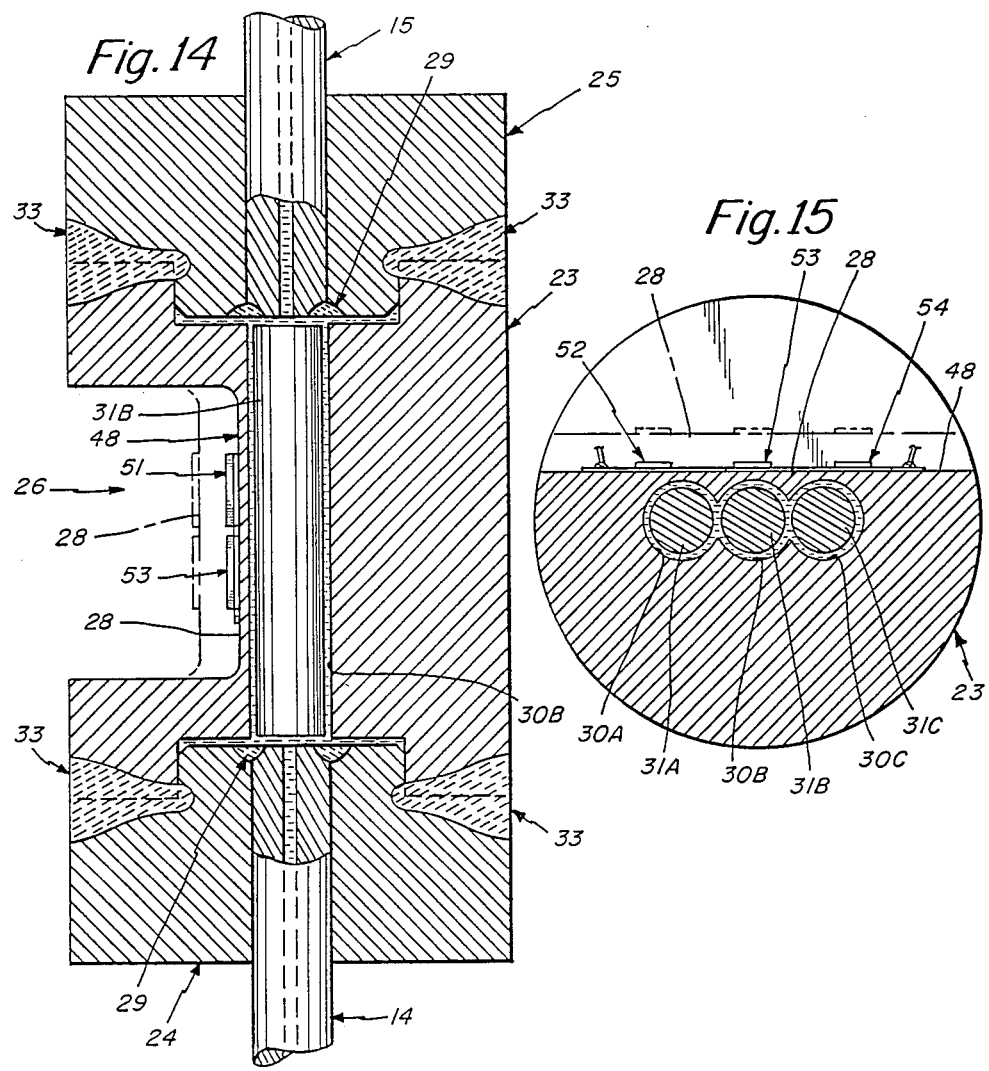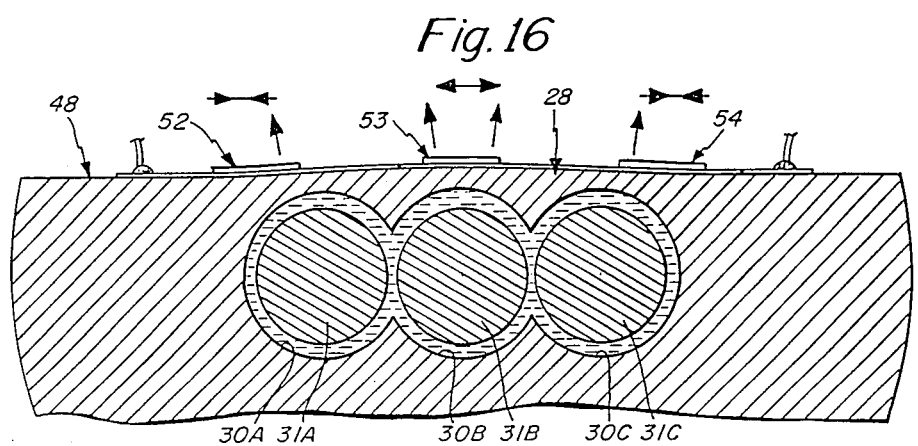

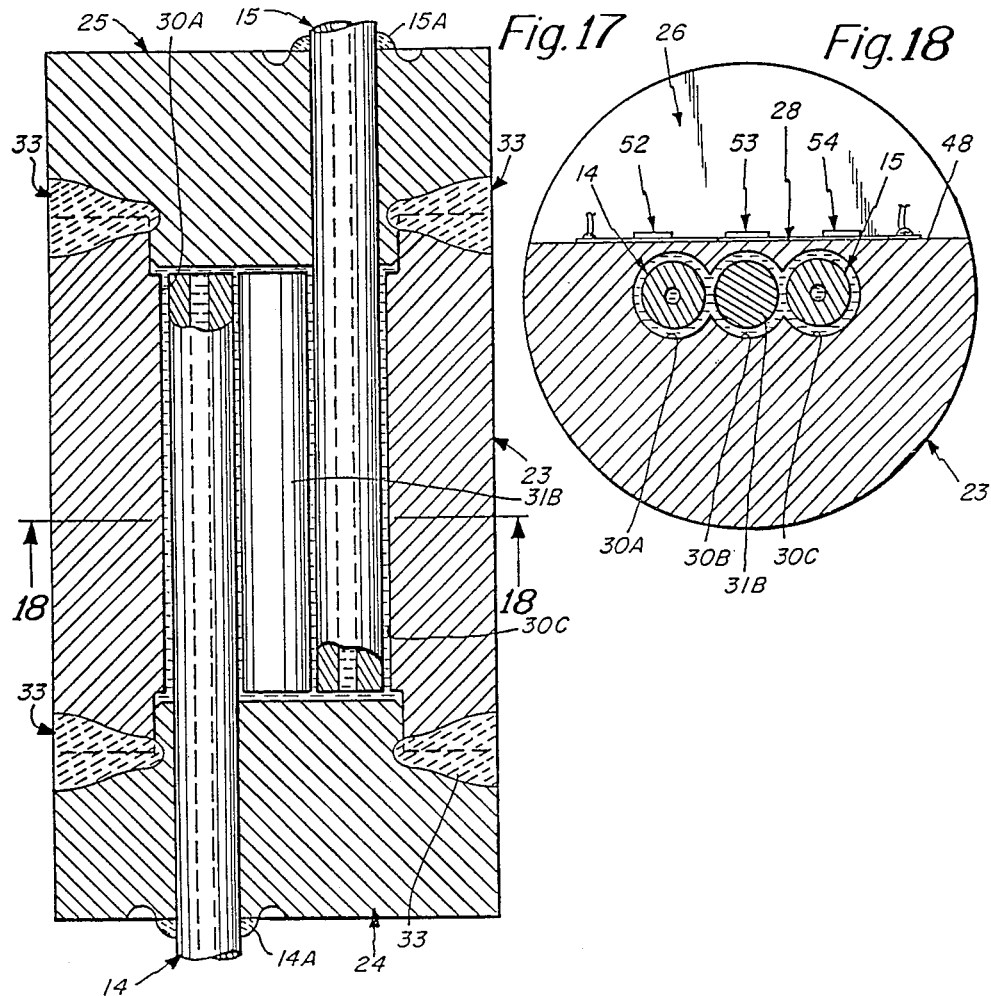

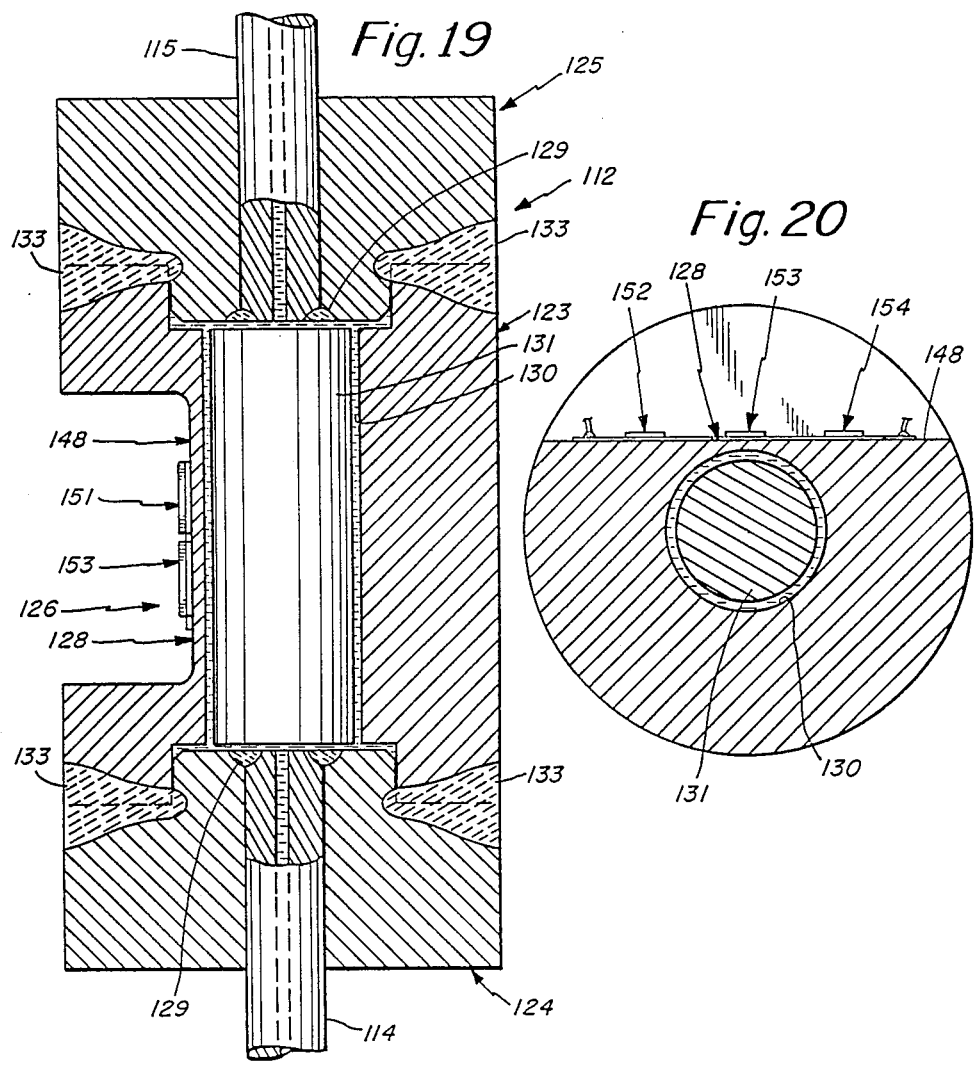
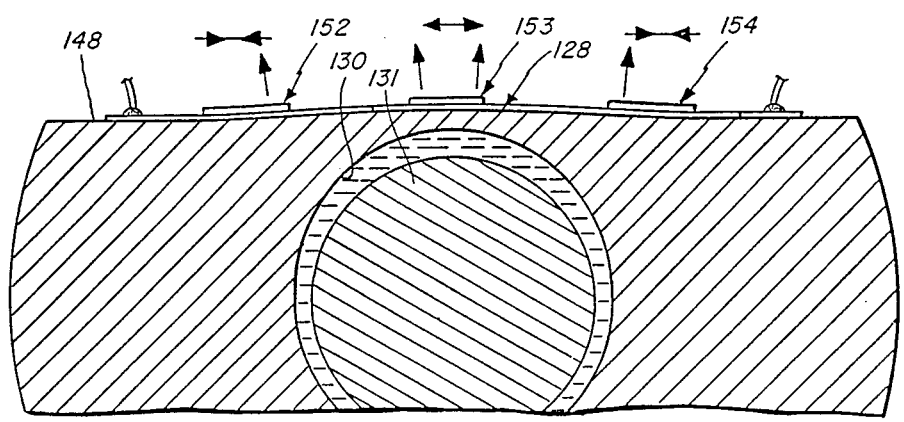

PRESSURE TRANSDUCER

RELATED APPLICATION

This is a continuation-in-part of application Ser. No. 054,747, filed May 27, 1987, now U.S. Pat. No. 4,819,747 Serial No. 054,936, filed May 27, 1987, now U.S. Pat. No. 4,829,827 Ser. No. 798,169, filed Nov. 14, 1985, now U.S. Pat. No. 4,679,438 and Ser. No. 689,385, filed Jan. 7, 1985, now U.S. Pat. No. 4,680,972.

BACKGROUND OF THE INVENTION

The present invention relates in general to pressure transducers and is concerned, more particularly, with a new and improved fluid-filled, direct-sensing pressure transducer. Even more particularly, the present invention relates to pressure transducer constructions that may be adapted for both mid-range and high pressure range measurements. The mid-range pressures are typically 1500–7500 psi and the high range pressures are typically 7500–50,000 psi. Moreover, the present invention relates to an improved method of forming the pressure transducer and in particular of interconnecting the transducer sensing element and capillary tube.

The following is a list of prior art patents that in general relate to pressure transducers: U.S. Pat. Nos. 3,349,623, 4,369,659, 3,678,753, 3,349,623, 2,940,313, 2,627,749, 2,326,047, 3,336,555, 2,738,677. Some of these patents are owned by the assignee herein and show fluid filled pressure transducers.

U.S. Pat. Nos. 2,949,313 and 2,627,749 both illustrate pressure indicators that employ strain tubes or the like for transmitting pressure to a diaphragm on which pressure is sensed by strain gages.

U.S. Pat. Nos. 3,326,047 and 3,336,555 illustrate pressure transducers. U.S. Pat. No. 3,336,555 illustrates an unfilled pressure transducer with strain gage sensing. U.S. Pat. No. 3,326,047 on the other hand illustrates a fluid filled pressure transducer employing a pressure sensing capsule having inner and outer deformable cylindrical walls. The liquid-filling in a transducer of this type has a relatively large volume and thus creates limitations upon the range of pressure measurements.

U.S. Pat. No. 2,738,677 is actually directed to a pressure indicator particularly for combustion chambers such as in an internal combustion engine.

Liquid-filled pressure transducers owned by the assignee herein include U.S. Pat. Nos. 3,349,623; 3,678,753; and 4,369,659. The early U.S. Pat. No. 3,349,623 describes a device employing an annular sensing chamber with associated strain gages. U.S. Pat. No. 3,678,753 is believed to be an improved form of the earlier version employing a top cap member and associated disc-shaped compartment defined between the cap member and the body of the instrument. The transducer illustrated in U.S. Pat. No. 3,678,753 provided an increased operating pressure range. U.S. Pat. No. 4,369,659 describes a melt pressure transducer preferably for use in pressure measurements associated with an injection molding machine and employing a novel temperature compensating filler rod.

Another prior art patent is U.S. Pat. No. 3,128,628 to Lebow. This patent illustrates a pressure transducer but does not employ any capillary tube.

In all of the prior art, referred to hereinbefore one of the main limitations, is the inability to operate particularly at high pressure levels such as in a pressure range of 10,000–50,000 psi.

Accordingly, one important object of the present invention is to provide a liquid-filled pressure transducer operating at high pressure ranges.

Another object of the present invention is to provide an improved pressure transducer that is fluid-filled and that employs a reduced volume of fluid. This reduced volume of fluid provides for minimization of temperature effects upon pressure and furthermore makes for improved diaphragm constructions.

Accordingly, a further object of the present invention is to provide an improved liquid-filled pressure transducer in which diaphragm stresses are reduced.

Still another object of the present invention is to provide an improved fluid-filled pressure transducer that provides for reduced snout diaphragm stresses during applied pressure and upon exposure to elevated temperature.

Still another object of the present invention is to provide an improved fluid-filled pressure transducer provided with a snout piece of a different material, provided for the purpose of temperature compensation and for improving overall performance. The snout piece permits the liquid-filled void to expand at the same rate as the liquid itself during temperature changes.

A further object of the present invention is to provide an improved method of construction of a liquid-filled pressure transducer, particularly an improved technique for interconnecting the sensing element and capillary tube of the pressure transducer.

SUMMARY OF THE INVENTION

To accomplish the foregoing and other objects features and advantages of the invention there is provided a pressure transducer which comprises an elongated frame having an elongated passage therethrough and a capillary tube extending through the frame passage and terminating at one end adjacent to one end of the frame. A coupler closes that one end of the frame and defines with the frame a chamber in communication with the capillary tube. A sensing member in accordance with the invention is disposed about the capillary tube at the other end of the frame and includes means defining an annular sensing chamber in fluid communication with the capillary tube. For this purpose there may be provided a passage transversely in the capillary tube to enable fluid communication from the capillary tube to this annular sensing chamber. The sensing member also includes means defining a recess therein forming a relatively thin wall adjacent the annular sensing chamber. This wall has a pressure responsive sensing surface that extends substantially parallel to the capillary tube length. The sensing of pressure may be accomplished by means of a strain gage arrangement disposed on the pressure responsive sensing surface of the relatively thin wall. the strain gage sensing means may be connected in a bridge arrangement. In accordance with one feature of the invention there is preferably also provided in the transducer at the diaphragm end thereof a snout piece of a different material than that of the frame of the transducer having a relatively low coefficient of expansion for providing temperature compensation.

Furthermore, in accordance with the present invention there is provided, in a liquid-filled pressure transducer having a frame, capillary tube extending through the frame, and a sensing element having a bore for receiving the capillary tube, an improved method for securing the sensing element to the capillary tube in a liquid-tight manner. The method comprises the steps of providing a weld prep indentation in the sensing element adjacent and about the sensing element bore, inserting the capillary tube in the sensing element and swaging the weld prep indentation so as to grip the capillary tube with at least a small gripping force. Finally, the area about the capillary tube is welded in the area where the weld prep indentation is disposed so as to form a liquid-tight weld between the capillary tube and sensing element. The annular indentation is at least partially formed by an inner ridge adjacent the capillary tube and in accordance with the step of swaging the weld prep indentation, this step includes distortion of the indentation to deflect the inner ridge so as to contact the capillary tube about the circumference thereof. The formation of this weld for securing the capillary tube and sensing element is carried out at both ends of the sensing element through which the capillary tube extends.

In accordance with the mid-range version of the invention, there is provided a pressure transducer which comprises an elongated frame having an elongated passage and terminating at one end adjacent to one end of the frame. A coupler closes that one end of the frame and defines with the frame a chamber in communication with the capillary tube. A sensing member in accordance with the invention is disposed about the capillary tube at the other end of the frame and includes means defining a sensing chamber in fluid communication with the capillary tube. The sensing chamber is formed by multiple interconnected passages each accommodating a filler rod. The sensing member may also include means defining a recess therein forming a relatively thin diaphragm with the multiple passage sensing chamber. This wall has a pressure responsive sensing surface that extends substantially parallel to the filler rod length. The sensing of pressure may be accomplished by means of a strain gage arrangement disposed on the pressure responsive sensing surface. The strain gage sensing means may be connected in a bridge arrangement. In accordance with one feature of the invention there is preferably also provided in the transducer at the diaphragm end thereof a snout piece of a different material than that of the frame of the transducer having a relatively low coefficient of expansion for providing temperature compensation.

BRIEF DESCRIPTION OF THE DRAWINGS

Numerous other object features and advantages of the invention should now become apparent upon a reading of the following detailed description taken in conjunction with the accompanying drawings, in which:

FIG. 1 is a cross-sectional side elevation view of a preferred embodiment of the fluid filled pressure transducer constructed in accordance with the present invention;

FIG. 2 is a cross-sectional view taken along line 2—2 of FIG. 1 showing further details of the sensing member;

FIG. 3 is a cross-sectional view taken along line 3—3 of FIG. 2 showing further details;

FIG. 12 is a cross-sectional side elevation view of a preferred embodiment of the fluid filled pressure transducer constructed in accordance with the principles of the present invention;

FIG. 12A is an enlarged cross-sectional view of a portion of a pressure transducer constructed in accordance with the invention and illustrating the further use of a snout filler piece;

FIG. 13 is a cross-sectional view taken along line 13—13 of FIG. 12 showing further details of the sensing member;

FIG. 13A is a fragmentary view similar to that illustrated in FIG. 13 but showing an alternate placement of the strain gages which is an in-line positioning;

FIG. 14 is a cross-sectional view taken along line 14—14 of FIG. 13 showing further details;

FIG. 15 is a cross-sectional view taken along line 15—15 of FIG. 13 showing still further details of the sensing member;

FIG. 16 is an enlarged cross-sectional view relating to FIG. 15 and illustrating the diaphragm under pressure;

FIG. 17 is a longitudinal cross-sectional view of an alternate embodiment of the sensing member of the invention in which the capillary tubes extend into the sensing chamber;

FIG. 18 is a cross-sectional view taken along line 18—18 of FIG. 17 and showing further details;

FIG. 19 is a cross-sectional view of an alternate embodiment of the invention employing a single filler rod;

FIG. 20 is a cross-sectional view through the sensing member; and

FIG. 21 is an enlarged fragmentary view relating to FIG. 20 and showing still further details of the sensing member.

DETAILED DESCRIPTION

Figure 4:
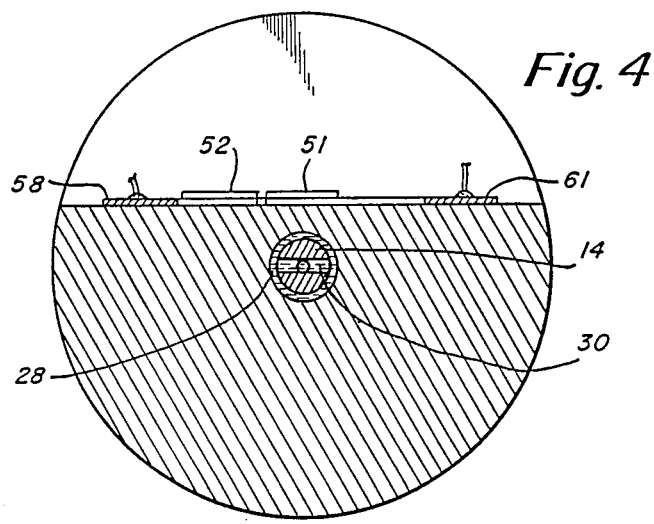
FIG. 4 is a cross-sectional view taken along line 4—4 of FIG. 2 showing still further details of the sensing member.
Figure 5:
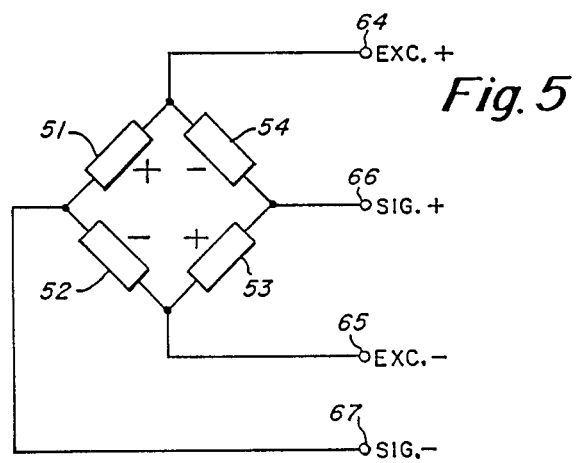
FIG. 5 is a schematic diagram illustrating the strain gage circuit employed in connection with the pressure transducer of the invention.
Figure 6:
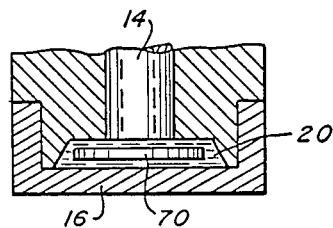
FIG. 6 is an enlarged cross-sectional view of a portion of a pressure transducer constructed in accordance with the invention and illustrating the further use of a snout filler piece.
Figure 7:
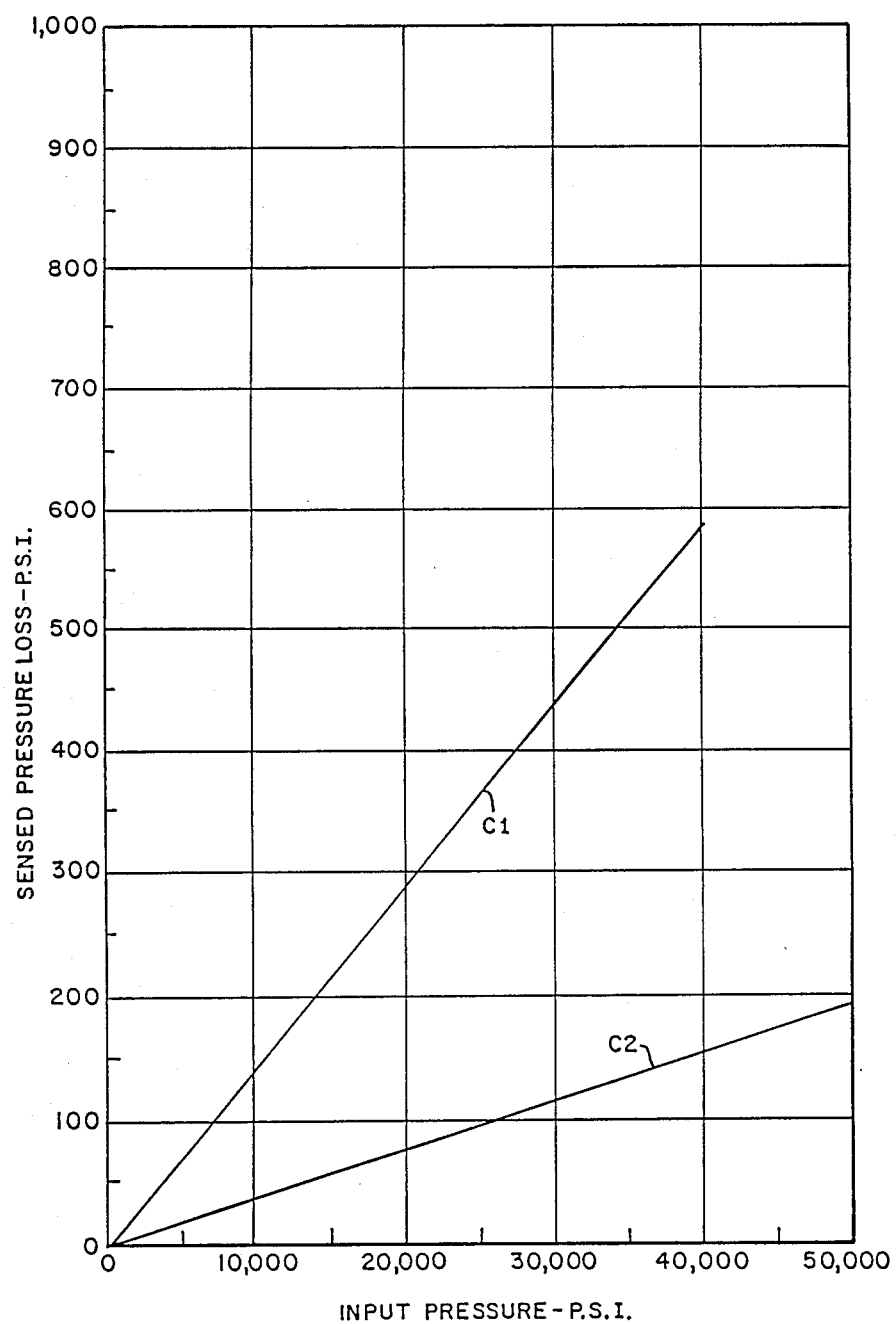
FIG. 7 is a graph illustrating input pressure versus pressure loss through the diaphragm.

Reference is now made to FIGS. 1-4 which show complete details of one embodiment of a pressure transducer in accordance with the invention. FIG. 5 shows the schematic diagram of the strain gage interconnections. FIG. 6 is an alternate embodiment from the standpoint of illustrating the preferred use of a filler piece at the diaphragm end of the transducer. FIG. 7 is a graph of illustrating transducer performance. FIGS. 8-11 illustrate steps in the method of the present invention concerned in particular with the securing of the capillary tube and sensing element in a liquid-tight manner. With reference to FIGS. 1-4, the pressure transducer includes a main frame 10, a sensing member 12 provided at the top of the frame 10, a capillary tube 14 which extends through the frame, and a diaphragm coupler 16 secured to and enclosing the bottom end of the frame.

The lower section of the frame 10 is constructed in a similar manner to the construction illustrated in U.S. Pat. No. 3,678,753. Basically there is an elongated passage 18 that extends through the main frame and which is for accommodating the capillary tube 14. The capillary tube 14 at its bottom end terminates at a relatively small chamber 20 which is closed by the diaphragm 16.

At the top end of the frame 10 there is included as part of the frame a top piece 22 through which the capillary tube 14 extends. The top piece 22 is for supporting the sensing member 12 in the position illustrated in the drawing. The sensing member 12 may be secured in position within the top piece 22 by being welded to the top piece.

The capillary tube 14 as noted in, for example, FIG. 3, extends through a vertical passage in the sensing member 12. It is noted that in FIG. 3 that the capillary tube 14, in accordance with one embodiment of the invention, is provided with an annular recess 26 that defines an annular chamber 28 essentially defined by the recess in the capillary tube and the inner bore of the passage that extends vertically through the sensing member 12.

In order to provide fluid communication from the capillary tube to the chamber 28 there is provided a transverse passage 30 which is disposed in the position as illustrated in FIG. 3.

The sensing member 12, as indicated previously, includes a vertical passage through which the capillary tube 14 extends. As illustrated in FIG. 1, the capillary tube 14 also extends beyond the top of the sensing member 12 and is provided at its top end with some type of a filler cap 32. The sensing member 12 is furthermore constructed by machining a single flat surface on the outside of its cylindrical body. This is illustrated in FIGS. 1-3 by the recess 34 that extends in the vertical direction in FIG. 3 somewhat less than one third of the total height of the cylindrical sensing member. As indicated previously, the cylindrical sensing member is through-drilled along its full length at its center axis and fitted closely to the capillary tubing which passes therethrough. The capillary tubing is preferably TIG welded at both ends as illustrated by the welds 38 in FIG. 3. The ends of the sensing member 12, such as at surfaces including the cup shaped indentations so as to aid in maximizing weld penetration and strength between the capillary tube and the sensing member.

Prior to insertion of the capillary tube, a 0.015 to 0.020 inch diameter lateral hole 30 is drilled through the center of the capillary to allow fluid communication between the capillary tube and the annular chamber 28. The hole 30 may be drilled approximately 3 inches from one end of the sensing member and the relative position of the capillary tube and the sensing member are arranged so that the hole is placed as indicated in FIG. 3 at about the mid distance of the recess 34. The capillary is, of course, welded at both ends of the sensing element at illustrated in FIG. 3 to form essentially upper and lower liquid leak-tight joints.

Hydraulic pressure from inside of the capillary tube bore is transmitted to the annular sensing element by way of the hole 30. This fluid communication enables the inside surface of the sensing member to be pressurized.

The machined recess 34 defines a relatively thin wall 46, the thickness of which is perhaps somewhat exaggerated in FIG. 3. The wall 46 has a pressure responsive sensing surface 48 to which the strain gages are secured. Hydraulic pressure under the machined flat essentially at the annular chamber 28 creates high bending stresses across the thin flat wall 46 where the active strain gages are attached. This action senses the strained surface along the center line axis. In this regard, refer to FIG. 2 which illustrates, along the center line of the capillary 14, the active strain gages 51 and 53. Also note in FIG. 2 the other strain gages 52 and 54 which, with the strain gages 51 and 53, provide the total strain gage circuit. The strain gages 52 and 54 may be considered as the inactive strain gages but do sense some compression strains to add to the electrical sensitivity. However, the strain gages 52 and 54 are used primarily to complete the Wheatstone bridge and to provide thermal compensation.

FIG. 2 also shows, associated with the strain gages 51-54, electrical interconnection tabs. These include tabs 58 and 59 to the left in FIG. 2 and tabs 60, 61 and 62 to the right in FIG. 2. THese connection tabs are connected with the strain gages so as to connect the strain gages in the pattern illustrated in FIG. 5. In FIG. 5 the same reference characters are employed to identify the same strain gages illustrated in FIG. 2. Thus, the circuit interconnection of FIG. 5 illustrates the strain gages 51-54 schematically represented as variable resistances, varying with applied pressure. These resistances are interconnected in a bridge arrangement as illustrated in FIG. 5 having excitation inputs at terminals 64 and 65 and having a signal output at terminals 66 and 67.

An electrical input signal is usually applied across the input terminals 64 and 65 and the pressure responsive voltage is measured across the output terminals 66 and 67. Once again, the active gages are gages 51 and 53 and thus the majority of the pressure responsive signal is generated by these legs of the bridge. The gages 52 and 54 primarily provide for temperature compensation so that if there is a change in temperature at the sensing member, the bridge is automatically adjusted by virtue of the temperature of both of the nonactive gages causing essentially a nulling of the bridge.

One of the improved features in accordance with the present invention is the reduced amount of liquid fill that is employed in the transducer. This drastically reduces the fill displacement and thus controls pressure induced deflections. This is thus successful in minimizing diaphragm stresses and in enabling the use of thicker diaphragms. The reduction in fill is carried out by virtue of the use of the sensing member 12 with its substantially minimal fill volume. The volume is also minimized by virtue of other structural elements that are employed including the relatively small snout chamber and capillary tube.

Reference is now also made to FIG. 6 which shows an enlarged fragmentary view illustrating a preferred embodiment for the snout end of the device illustrating the snout filler piece 70 which is primarily used for temperature compensation reasons. This piece may be constructed by Kovar or Invar. Alternatively, this may be constructed of any very low coefficient of expansion material. It is preferred that it have a coefficient of expansion much less than that of the stainless steel frame. This fill piece 70 allows the void in chamber 20 to expand at the same rate as the liquid during temperature changes. The filler piece 70 illustrated in FIG. 6, functions to reduce internal fill pressure as the tip is heated with no applied pressure.

There have been at least two different liquid fills that have been employed, one being mercury and the other sodium potassium (NaK). The NaK filled transducer is a lower pressure range transducer while the mercury transducer has a pressure range of 10,000-50,000 psi. The range of pressure operation when using a NaK fill is 10,000-15,000 psi.

Thus, the filler piece, in combination with the chamber 20 illustrated in FIG. 6, provides a thermally compensated internal volume which is desired. Also, the filler piece as indicated previously is selected to have thermal properties that temperature compensate the transducer for differential thermal expansion coefficients between the internal fluid which is preferably mercury and the main body of the transducer which is usually stainless steel. As indicated previously, it is preferred to have a low temperature coefficient of expansion particularly in comparison with that of the frame material.

One of the advantages that has been realized with the improved sensing technique of the present invention is the capability of now being able to increase the thickness of the diaphragm 16 while reducing the stresses thereof. It has also been possible in accordance with this construction to minimize overall thermal characteristics. Reducing fill displacement under pressure reduces the diaphragm deflection and the resulting stresses allows the diaphragm to be increased in thickness within certain limitations to improve insitu durability.

In connection with the above, the maximum diaphragm thickness is related to two independent effects including internal fluid displacement under applied pressure and secondly internal pressure generated by thermal expansion of the contained fluid fill. In accordance with the invention, the sensor's small internal volume reduces the amount of fill and its resulting compression. Moreover, the sensor's low displacement or deflection under pressure further reduces total fluid displacement and resulting stresses. Moreover, the filler piece is adapted to control thermally induced internal pressure that also further reduces stresses. The combined improvements outlined above allow diaphragm thickness to be increased without increasing stresses and controls internal pressure effects versus temperature. The snout filler piece 70 is used in essence to replace some of the stainless steel at the tip of the instrument with a low temperature coefficient of expansion material thus temperature compensating the void 20. This preferred material as indicated previously, is Kovar or Invar.

With regard to the reduction in volume, it is noted that the internal volume of the sensing member 12 is very small because the capillary tube fills the passage through the member with very close tolerance fit. As a matter of fact, in the illustration of FIG. 3, there is shown a relatively predominant recess 26 in the capillary tube. However, in another embodiment that may be employed, the capillary tube need not be recessed at all but instead one can rely upon the slight difference in diameter between the bore of the member 12 and the outer diameter of the capillary tube. In such case, the annular sensing chamber about the capillary tube actually extends between top and bottom ends of the sensing member from weld-to-weld.

By way of example, the amount of volume of liquid in the capillary tube may be approximately 75 percent of the volume in the annular space about the capillary tube. The total volume within the entire transducer including the capillary tube may be in a range from $1.0 \times 10^{-3}$ to $2.0 \times 10^{-3}$" cube. This very small volume compares with a transducer volume on the order of $3.2 \times 10^{-3}$" cube for a transducer which is of the type described in U.S. Pat. No. 3,678,753. It can be readily seen that there is an improvement in the reduction of volume fill by at least 2 to 1 between the volumes of the transducer in the prior art and that in the present construction. With regard to the capillary tube, the inner diameter thereof can range from 0.005 to 0.010", and the outer diameter thereof can range from 0.060" to 0.25".

With regard to the filling of the transducer, this is accomplished at the top end of the capillary tube. In FIG. 1 the capillary tube is shown capped off but before this occurs the capillary tube and the rest of the voids communicating therewith in the device are filled with say mercury under forced pressure so that all of the void areas are filled with the mercury. The capillary tube is then sealed off to retain the mercury in the transducer.

Reference is not made to FIG. 7 which is a graph of input pressure being sensed at the diaphragm versus the pressure lost at the snout diaphragm. There are actually two curves illustrated in FIG. 7. The curve C1 is a pressure curve for a prior art transducer such as the one described in U.S. Pat. No. 3,678,753. The curve C2 is the pressure curve for the transducer in accordance with the present invention. It is noted that even at high pressure ranges in the area of 40,000 psi that the absorbed pressure is only on the order of about 150 psi; consequently, diaphragm thickness can be increased. Increased thickness creates higher absorbed pressures, but its increased thickness will accommodate the higher pressures without generating higher stresses than those illustrated in curve C1 of FIG. 7.

Reference is now made to FIGS. 8-11 in connection with the teaching of the method of assembly of the transducer of the present invention and particular a method of securing together the capillary tube and sensing element. In this connection previously, two separate embodiments have been described, one in FIG. 3 employing an annular chamber 28 about the capillary tube and another embodiment in which relies upon a difference in diameter between the bore of the member 12 and the outer diameter of the capillary tube. However, it has been found that the capillary tube should not be too closely fitted in the bore of the sensing element. If the fit is too tight, then large non-linear calibration errors can occur due to capillary unevenness, bends in the capillary tube, and possible burrs at the drilled hole. This may cause the capillary tube to contact the bore under the strain gages causing these large non-linear calibration errors. The technique described in FIGS. 8-11 overcomes these problems.

Figure 8:
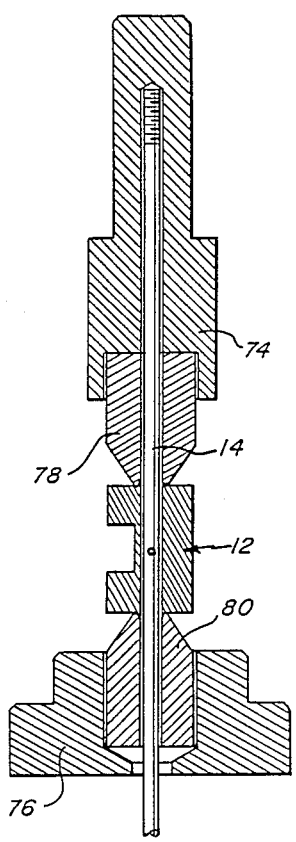
FIG. 8 illustrates the fixture that is employed along with the method of assembly for interconnection of the capillary tube and sensing element.

FIG. 8 shows the fixture that is used in carrying out the method of the present invention. This fixture includes an upper mandrel 74 and a lower mandrel 76. The upper mandrel 74 has a bore for receiving a portion of the capillary tube and also has a channel for receiving the upper crimp block 78. Similarly, the lower mandrel 76 has a channel for receiving the lower crimp block 80. Both of the crimp blocks 78 and 80 have passages therethrough for receiving the capillary tube in the manner illustrated in FIG. 8. FIG. 8 also shows the capillary tube 14 having been inserted in the bore of the sensing element 12.

Figure 9:
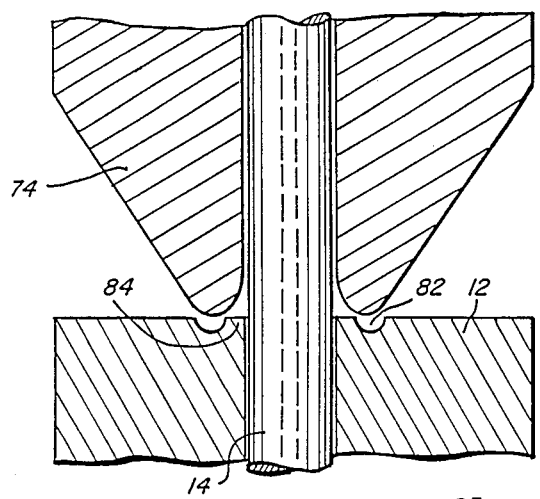
FIG. 9 is a cross-sectional view showing a first step in the method of assembly of the capillary tube and sensing element.

Now, in FIG. 9 there is illustrated in a fragmentary cross-sectional view, the capillary tube 14 and the sensing element 12. The fitting between the capillary tube and the sensing element is such that there is a gap G illustrated in FIG. 11 that is on the order of 0.001". FIG. 9 also illustrates the weld prep indentation 82 which is an annular indentation disposed about the circumference of the bore in the sensing element. This indentation defines on the inner side thereof, an annular ridge 84 as illustrated in FIG. 9. In FIG. 9 the upper mandrel 74 is disposed over the sensing element, but is not yet in contact therewith.

Figure 10:
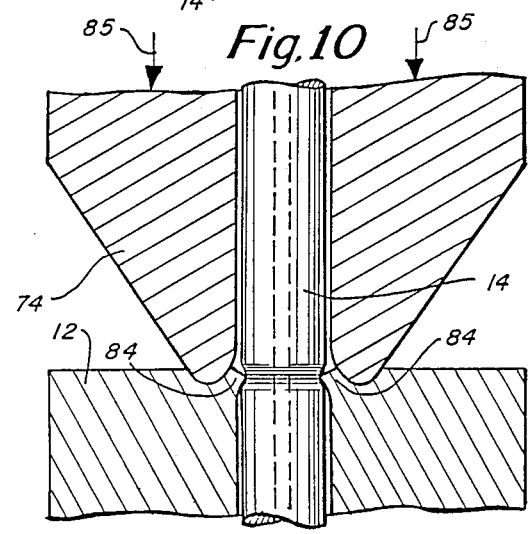
FIG. 10 is a fragmentary cross-sectional view illustrating a subsequent step in which the weld prep indentations have been swaged against the capillary tube to grip it.

FIG. 10 illustrates the upper mandrel 74 having been moved in the direction of arrows 85 so as to contact the indentation 82 and essentially crimp or swage the ridge 84 against the side of the capillary tube as illustrated in FIG. 10. FIG. 10 illustrates only one of the mandrels 74. However, it is understood that the operation is such that both mandrels are brought together at the same time crimping the weld prep indentations on either end of the sensing element 12.

Figure 11:
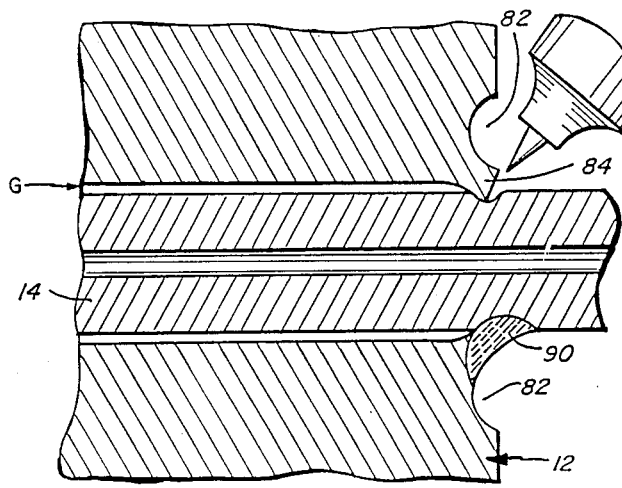
FIG. 11 is a further cross-sectional view showing subsequent steps including an illustration of the weld that is formed annularly about the capillary tube and between the capillary tube and sensing element.

After the capillary tube has been inserted through this sensing element into the position illustrated in FIG. 8 and after the weld indentations have been crimped as illustrated in FIG. 10, then welding can occur as illustrated in FIG. 11. In connection with the swaging or crimping, this is preferably controlled so that the force against the capillary is just enough to hold the sensing element to the capillary tube without it slipping up and down.

With regard to the welding, reference is made to FIG. 11 which shows the weld tip 88 directed at the juncture where the crimping has occurred at the ridge 84 about the periphery of the capillary tube. FIG. 11 also illustrates the final weld at 90. This is, of course, an annular weld that goes about the entire circumference of the capillary tube providing a liquid-tight seal thereabout so that the liquid fill within the transducer of course, could not be expelled at that location. The liquid is meant to be held in the annular chamber extending about the capillary tube in between the inner bore of the sensing element and the capillary tube.

With reference to FIGS. 12-16, the pressure transducer includes a main frame 10, a sensing member 12 provided at the top of the frame 10, a capillary tube 14 which extends through the frame, and a diaphragm coupler 16 secured to and enclosing the bottom end of the frame.

The lower section of the frame 10 is constructed in a similar manner to the construction illustrated in U.S. Pat. No. 3,678,753. Basically there is an elongated passage 18 that extends through the main frame and which is for accommodating the capillary tube 14. The capillary tube 14 at its bottom end terminates at a relatively small chamber 20 which is closed by the diaphragm 16.

At the top end of the frame 10 there is included as part of the frame a top piece 22 through which the capillary tube 14 extends. The top piece 22 is for supporting the sensing member 12 in the position illustrated in the drawing. The sensing member 12 may be secured in position within the top piece 22 by being welded to the top piece.

Before consideration is given to the details of the sensing member 12, reference is now made to FIG. 12A. FIG. 12A shows an enlarged fragmentary view illustrating a preferred embodiment for the snout end of the device showing the snout filler piece 70 which is primarily used for temperature compensation reasons. This piece may be constructed of Kovar or Invar. Alternatively, this may be constructed of any very low coefficient of expansion material. It is preferred that it have a coefficient of expansion much less than that of the stainless steel frame. This fill piece 70 allows the void in chamber 20 to expand at the same rate as the liquid during temperature changes. The filler piece 70 illustrated in FIG. 6, functions to reduce internal fill pressure as the tip is heated with no applied pressure.

In connection with the liquid fill used in the device of the present invention, at least two different liquid fills may be employed. One typical liquid fill is mercury and the other may be, for example, sodium potassium (NaK). The NaK filled transducer is generally a lower pressure range transducer while the mercury transducer is usually used at higher relative pressures. Either of these fills may be used at the pressure ranges employed in accordance with the present invention.

Thus, the filler piece, in combination with the chamber 20 illustrated in FIG. 12A, provides a thermally compensated internal volume which is desired. Also, the filler piece as indicated previously is selected to have thermal properties that temperature compensate the transducer for differential thermal expansion coefficients between the internal fluid which is preferably mercury and the main body of the transducer which is usually stainless steel. As indicated previously, it is preferred to have a low temperature coefficient of expansion particularly in comparison with that of the frame material.

One of the advantages that has been realized with the improved sensing technique os the present invention is the capability of now being able to increase the thickness of the diaphragm 16 while reducing the stresses thereof. It has also been possible in accordance with this construction to minimize overall thermal characteristics. Reducing fill displacement under pressure reduces the diaphragm deflection and the resulting stresses allows the diaphragm to be increased in thickness within certain limitations to improve insitu durability.

In connection with the above, the maximum diaphragm thickness is related to two independent effects including internal fluid displacement under applied pressure and secondly internal pressure generated by thermal expansion of the contained fluid fill. In accordance with the invention, the sensor's small internal volume reduces the amount of fill and its resulting compression. Moreover, the sensor's low displacement or deflection under pressure further reduces total fluid displacement and resulting stresses. Moreover, the filler piece is adapted to control thermally induced internal pressure that also further reduces stresses. The combined improvements outlined above allow diaphragm thickness to be increased without increasing stresses and controls internal pressure effects versus temperature.

The snout filler piece 70 is used in essence to replace some of the stainless steel at the tip of the instrument with a low temperature coefficient of expansion material thus temperature compensating the void 20. This preferred material as indicated previously, is Kovar or Invar.

With regard to the reduction in volume, it is noted that the internal volume of the sensing member 12 is very small because of the use of filler rods herein as to be described in association with the further description of the sensing member in FIGS. 13–16. The total volume within the entire transducer including the capillary tube may be in a range from $1.0 \times 10^{-3}$ to $2.0 \times 10^{-3}$ cubic inch. This very small volume compares with a transducer volume on the order of $3.2 \times 10^{-3}$ cubic inch for a transducer which is of the type described in U.S. Pat. No. 3,678,753. It can be readily seen that there is an improvement in the reduction of volume fill by at least 2 to 1 between the volumes of the transducer in the prior art and that in the present construction. With regard to the capillary tube, the inner diameter thereof can range from 0.005 to 0.010″, and the outer diameter thereof can range from 0.060″ to 0.25″.

With regard to the filling of the transducer, this is accomplished at the filler tube 15. In FIG. 12 the filler tube is shown capped off but before this occurs the capillary tube and the rest of the voids communicating therewith in the device are filled with say mercury under vacuum and forced pressure after filling so that all of the void areas are filled with the mercury. The filler tube is then sealed off to retain the mercury in the transducer.

With reference to the construction of a sensing member 12, reference is now made to FIGS. 13–17. The sensing member 12 includes a main body 23 and associated end members 24 and 25. The main body 23 is provided with a recess 26 for receiving the strain gages on a surface 48 thereof as will be described in more detail hereinafter.

Within the main body 23, there are provided coextensive passages 30A, 30B and 30C. Each of these passages receive respective filler rods 31A, 31B and 31C. Each of the passages and associated filler rods extend longitudinally with each filler rod fitting with closing tolerance spacing within its accommodating passage. Close tolerance fits are employed so that the volume filler liquid is minimized. Typically the difference in diameters between the passage and filler rod may be on the order of 0.0025″.

As illustrated in, for example, FIGS. 15 and 16, each of the passages 30A, 30B and 30C are coextensive and interconnect with each other forming a unitary sensing chamber defining a thin strain sensitive (diaphragm) wall 28. The strain gages are appropriately positioned on the surface 48 of the wall 18. In this regard, refer to FIG. 13 for a clear illustration of the placement of strain gages 51–54. In this regard, the strain gages 51 and 53 are associated with the passageway 30B. The gages 51 and 53 sense tensile strains.

The strain gages 52 and 54 are disposed more adjacent to the passages 30A and 30C, respectively. Refer to FIGS. 15 and 16 in this regard. The strain gages 52 and 54 are for sensing compression strains. Thus, with the sensing structure of the present invention, all four strain gages are active gages.

With respect to the fabrication of the transducer illustrated in FIGS. 12–16, it is noted that each of the end members 24 and 25 have centrally disposed passages therein for accommodating the respective capillary tube 14 and filler tube 15. The capillary tube 14 and filler tube 15 are welded within their respective end members as illustrated at 29 in FIG. 14.

The next step is to provide the filler rods within their accommodating passages in the main body 23. Next, the end members 24 and 25 are welded to the main body 23 as indicated at 33 in FIG. 14.

After the unit has been welded together and heat treated as illustrated by the cross-sectional view of FIG. 14, the strain gages are then affixed in the pattern as illustrated in FIG. 13. FIG. 13 also shows the conductive runs at 55 associated with the strain gages 51–54. In FIG. 14 there is also shown in solid outline, the sensitive (diaphragm) wall 28 for a lower pressure version. Also illustrated in FIG. 14 in phantom outline is a thicker wall 28 which would be used for a higher pressure version. Again, in accordance with the present invention, the expected pressure range for this intermediate pressure transducer is in the range of 500 psi to 7500 psi. There are increments of this pressure range and each increment would be fabricated using a different wall thickness for wall 28.

FIG. 13 also shows, associated with the strain gages 51–54, electrical connection tabs. These include tabs 58 and 59 to the right in FIG. 13 and tabs 60, 61 and 62 to the left in FIG. 13. These connection tabs are connected with the strain gages so as to connect the strain gages in the pattern illustrated in FIG. 16B. In FIG. 16B the same reference characters are employed to identify the same gages as illustrated in FIG. 13. Thus, the circuit interconnection of FIG. 16B illustrates the strain gages 51–54 schematically represented as variable resistances, varying with applied pressure. These resistances are interconnected in a bridge arrangement as illustrated in FIG. 16B having excitation inputs at terminals 64 and 65 and having a signal output at terminals 66 and 67.

An electrical input signal is usually applied across the input terminals 64 and 65 and the pressure responsive voltage is measured across the output terminals 66 and 67. Once again, the compressive gages are gages 52 and 54 while the tensile gages are gages 51 and 53.

In constructing the embodiment of the invention illustrated in FIGS. 13–16, it has been mentioned previously that passages 30A, 30B and 30C are formed in the main body 23. These accommodate the filler rods 31A, 31B and 31C. These filler rods may be constructed of Invar or Kovar or stainless steel so as to provide some temperature compensation for the transducer. This provides temperature compensation in the same manner as the filler piece previously described in connection with FIG. 12A. The formation of the passage 30A, 30B and 30C is in the following manner. Smaller passages are initially drilled with their being no interconnection laterally between these passages. Subsequently, each of the passages is then reamed out so as to provide the finished structure as illustrated in FIG. 16. When the passages are reamed, then these passages are enlarged in diameter and thus become coextensive as illustrated in FIG. 16.

Reference is now made to FIG. 13A. For an illustration of a fragmentary view of an alternate version of the invention relating primarily to the mechanical transducer structure of FIGS. 13–16. In FIG. 13 it is noted that the strain gages 51–54 are disposed in a somewhat staggered array. FIG. 2A instead illustrates the strain gages 51A–54A in a linear array. It is noted that the compression gages 52A and 54A are disposed in a similar position to the gages 52 and 54 such as illustrated in FIG. 16. The tensile gages 51A and 53A are disposed symmetrically on either side of the longitudinal center line of the center passage 30B. In the alternate version of FIG. 13A, the gages 51–54 are interconnected in a bridge circuit in the same manner as depicted in FIGS. 13 and 16B.

Reference is now also made to a further alternate embodiment of FIGS. 13–16. This is illustrated in the fragmentary cross-sectional view of FIG. 16A. FIG. 16A shows the strain gages disposed in a similar manner to that illustrated in FIG. 16. However, in the embodiment of FIG. 16A, rather than employing three separate interconnected passages 30A–30C, there is provided a single elongated passage 30D for accommodating a single filler piece 31D. As with the filler rods 31A–31C, the filler piece 31D fits with close tolerance in the elongated passage 30D. In the version of FIG. 16A, the length of the passage 30D and the filler piece 31D is the same as the corresponding length of the filler rods and passages illustrated in, for example, FIGS. 13 and 14.

Figure 16A:
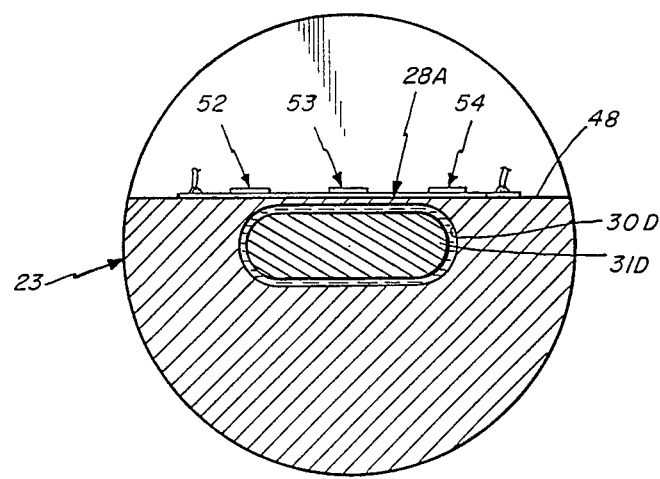
FIG. 16A is a cross-sectional view similar to that of FIG. 16 but illustrating an alternate embodiment in which the filler member is of single-piece construction.
Figure 16B:
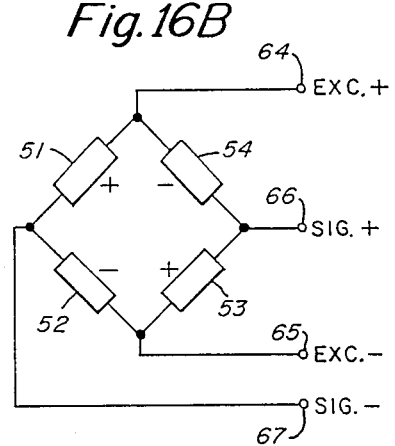
FIG. 16B is a schematic diagram illustrating the strain gage circuit employed in connection with the pressure transducer of the invention.

It is furthermore noted that in FIG. 5A the elongated shape of the passage and associated filler piece provides a strain sensitive wall 28A that is of a length in FIG. 16A comparable to the length of the sensing wall 28 in FIG. 16.

One further embodiment of the invention is illustrated in FIGS. 17 and 18. This includes a main body 23, with the end members 24 and 25. The end member 24 accommodates the capillary tube 14 and, similarly, the end member 25 accommodates the filler capillary tube 15. It is noted that in this particular embodiment, the capillary tube welded at 14A to the end member 24. Also, the filler capillary tube 15 is welded at 15A to the end member 25. Also illustrated in FIG. 17 are welds 33 for securing the main body and the end members.

In the embodiment of FIGS. 17 and 18, the main body 23 is provided with the recess 26 with the strain gage receiving surface 48. The strain gages are mounted to the surface 48 as in the previous embodiment.

The main body 23 is provided with the same passage arrangement as illustrated in the first embodiment including passages 30A, 30B and 30C that are coextensive with each other.

The primary difference in the embodiment in FIGS. 17 and 18 is that instead of using three filler rods, there is provided only a single filler rod 31B which is used in the center passage 30B. The other passages 30A and 30C are essentially filled by the respective capillary tubes 14 and 15. Note in particular the cross-sectional view of FIG. 17 wherein the capillary tube 14 does not terminate at the end member 24, but instead extends into the chamber formed by the passages and extends into and through the passage 30A. Similarly, the filler capillary tube 15 does not terminate at the end member 25, but instead extends into the passage 30C. Thus, in this particular embodiment, the ends of the respective capillary tubes actually form a filler means. The ends of the capillary tube communicate with the respective passages and thus the liquid fill, preferably mercury, fills the entire passage structure.

Reference is now made to FIGS. 19–21 for an illustration of still another embodiment of the present invention, which is particularly advantageous in that the sensing chamber is of a single cylindrical bore as represented by the passage 130. With the single bore there is also, of course, only a single filler rod 131. As illustrated in FIG. 19, it is noted that the filler rod 131 is concentric with the capillary tube 114.

In FIGS. 19–21 the sensing member 112 includes a main body 123 and associated end members 124 and 125. The main body 123 is provided with a recess 126 for receiving the strain gauges on a surface 148 thereof as will be described in more detail hereinafter.

Within the main body 123, there is provided a passage 130. The passage 130 is approximately twice the diameter of one of the previous passages such as that illustrated in FIG. 14 herein. The passage 130 receives the filler rod 131. The filler rod may be constructed of a material such as stainless steel, carbide, or kolvar. The filler rod 131 may have a diameter of about 0.125 inch.

The passage 130 and associated filler rod 131 extend longitudinally, and the rod fits with close tolerance within its accomodating passage. A close tolerance fit is employed so that the preferred liquid mercury fill is of minimum volume. Typically, the difference in diameters between the passage and filler rod may be on the order of 0.0025 inch.

The filler rod in conjunction with the member 123 and its passage 130 forms a unitary sensing chamber defining a thin wall 128 defining a diaphragm. The strain gauges are appropriately positioned on the surface 148 of the wall 128. In this regard, refer to the previous embodiment and, in particular, FIG. 2 for a clear illustration of the placement of the strain gauges 151–154. In this regard, the strain gauges 151 and 153 are associated with and overlie the wall 128 at the diaphragm wall portion. The strain gauges 151 and 153 sense tensile strains.

The strain gauges 152 and 154 are disposed essentially outside of the diameter of the sensing chamber. FIG. 20 in particular shows the placement of all of the gauges. The strain gauges 152 and 154 are for sensing compression strains. Thus, with the sensing structure of the present invention, all four strain gauges are active gauges, although in this particular embodiment the gauges 152 and 154 are measuring relatively weaker compressive strains.

With respect to the fabrication of the transducer illustrated in FIGS. 19–20, it is noted that each of the end members 124 and 125 have centrally disposed passages therein for accomodating the respective capillary tube 114 and filler tube 115. The capillary tube 114 and the filler tube 115 are welded within their respective end members as illustrated at 129 in FIG. 19.

The next step is to provide the filler rod 131 within its accommodating passage 130 in the main body 123. Next, the end members 124 and 125 are welded to the main body 123 as indicated at 133 in FIG. 19.

After the unit has been welded together and heat-treated as illustrated by the cross-sectional view of FIG. 19, the strain gages are then affixed in the pattern as illustrated in FIG. 2. FIG. 2 also shows the conductive runs that would be associated with the strain gages 151–154.

Having now described a limited number of embodiments of the present invention, it should now be apparent to those skilled in the art that numerous other embodiments and modifications thereof are contemplated as falling within the scope of the present invention as defined by the appended claims.

What is claimed is:
1. A pressure transducer comprising;
an elongated frame having an elongated passage therethrough, a capillary tube extending through the frame passage and terminating at one end adjacent one end of the frame, a coupler at said one end of the frame and defining with the frame a chamber in communication with the capillary tube, a sensing member disposed about the capillary tube at the other end of the frame and including means defining an annular sensing chamber in fluid communication with the capillary tube, and means defining a recess in the sensing member forming a relatively thin wall adjacent said annular sensing chamber, a filler means disposed in said sensing chamber, said filler means comprising a single filler rod, and means for sensing pressure at said wall.

2. A pressure transducer as set forth in claim 1 wherein said relatively thin wall has a pressure responsive sensing surface and said means for sensing comprises at least one sensing gage disposed on said sensing surface.

3. A pressure transducer as set forth in claim 2 wherein said pressure responsive sensing surface extends substantially parallel to the capillary tube length.

4. A pressure transducer as set forth in claim 3 wherein said pressure responsive sensing surface is substantially flat.

5. A pressure transducer as set forth in claim 4 wherein the sensing member is substantially cylindrical and said recess forms a flat surface closely adjacent the capillary tube.

6. A pressure transducer as set forth in claim 1 wherein said capillary tube has a open end permitting fluid communication between the capillary tube and said annular sensing chamber.

7. A pressure transducer as set forth in claim 1 wherein said annular sensing chamber is defined by a single cylindrical bore.

8. A pressure transducer as set forth in claim 7 wherein said filler rod is a cylindrical rod.

9. A pressure transducer as set forth in claim 1 wherein the capillary tube is secured at top and bottom ends of the sensing member.

10. A pressure transducer as set forth in claim 9 wherein the securing of the capillary tube is by welding.

11. A pressure transducer as set forth in claim 1 wherein said means for sensing comprises a pair of strain gages disposed on a pressure responsive sensing surface of said thin wall and each overlying the center line of the capillary tube.

12. A pressure transducer as set forth in claim 11 wherein there are also included two other substantially nonactive strain gages disposed outside of the position of the in-line strain gages.

13. A pressure transducer as set forth in claim 1 including a filler piece in the coupler chamber.

14. A pressure transducer as set forth in claim 13 wherein said filler piece has a coefficient of expansion substantially less than that of the frame.

15. A pressure transducer as set forth in claim 1 in which said sensing member is adaptive for operation over a pressure range of 10,000–50,000 psi.

16. A pressure transducer comprising;
an elongated frame having an elongated passage therethrough, a capillary tube extending through the frame passage and terminating at one end adjacent one end of the frame, a coupler at said one end of the frame and defining with the frame a chamber in communication with the capillary tube, a sensing member disposed about the capillary tube at the other end of the frame and including means defining an annular sensing chamber in fluid communication with the capillary tube, and means defining a recess in the sensing member forming a relatively thin wall adjacent said annular sensing chamber, a single piece filler means disposed in said sensing chamber, means for sensing pressure at said wall, and means for securing the capillary tube at the top and bottom ends of the sensing member including annular weld beads at either end.

17. A pressure transducer as set forth in claim 16 wherein the gap between the capillary tube and the bore in the sensing member is on the order of 0.001".

18. A pressure transducer comprising;
an elongated frame having an elongated passage therethrough, a capillary tube extending through the frame passage and terminating at one end adjacent one end of the frame, a coupler at said one end of the frame and defining with the frame a chamber in communication with the capillary tube, a sensing member disposed at the other end of the frame and having a passage therein for receiving the capillary tube, said sensing member having a sensing chamber formed therein defining a relatively thin wall forming a sensing surface adjacent said sensing chamber, a filler means disposed in said sensing chamber, a single piece filler rod means disposed in said sensing chamber, and means for sensing pressure at said wall.

19. A pressure transducer as set forth in claim 18 wherein said sensing surface is defined by a recess in the sensing member and said capillary tube has a passage therethrough extending substantially transverse to the axis thereof and for permitting fluid communication between the capillary tube and said sensing chamber.

20. A pressure transducer as set forth in claim 19 wherein said relatively thin wall has a pressure responsive sensing surface and said means for sensing comprises at least one sensing gage disposed on said sensing surface.

21. A pressure transducer as set forth in claim 18 wherein said sensing chamber is comprised of a single passage for accomodating said single piece filler rod means.

22. A pressure transducer as set forth in claim 21 further including a filler tube and wherein said sensing member comprises a main body and separate end members for receiving said respective capillary tube and filler tube.

23. A pressure transducer as set forth in claim 21 wherein said single piece filler rod means is comprised of a single metalic cylindrical rod.

* * * * *